Patented Mar. 13, 1928.

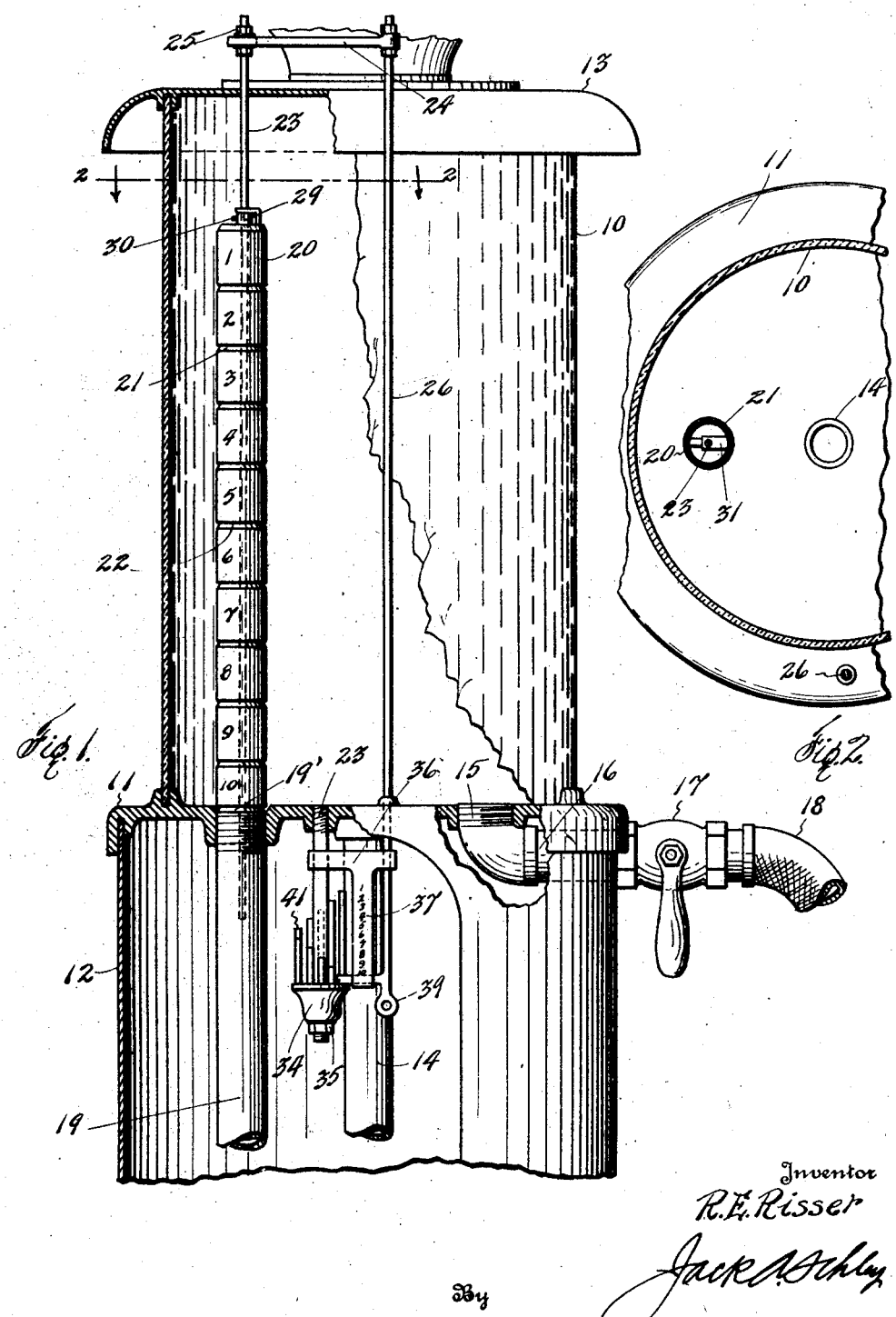

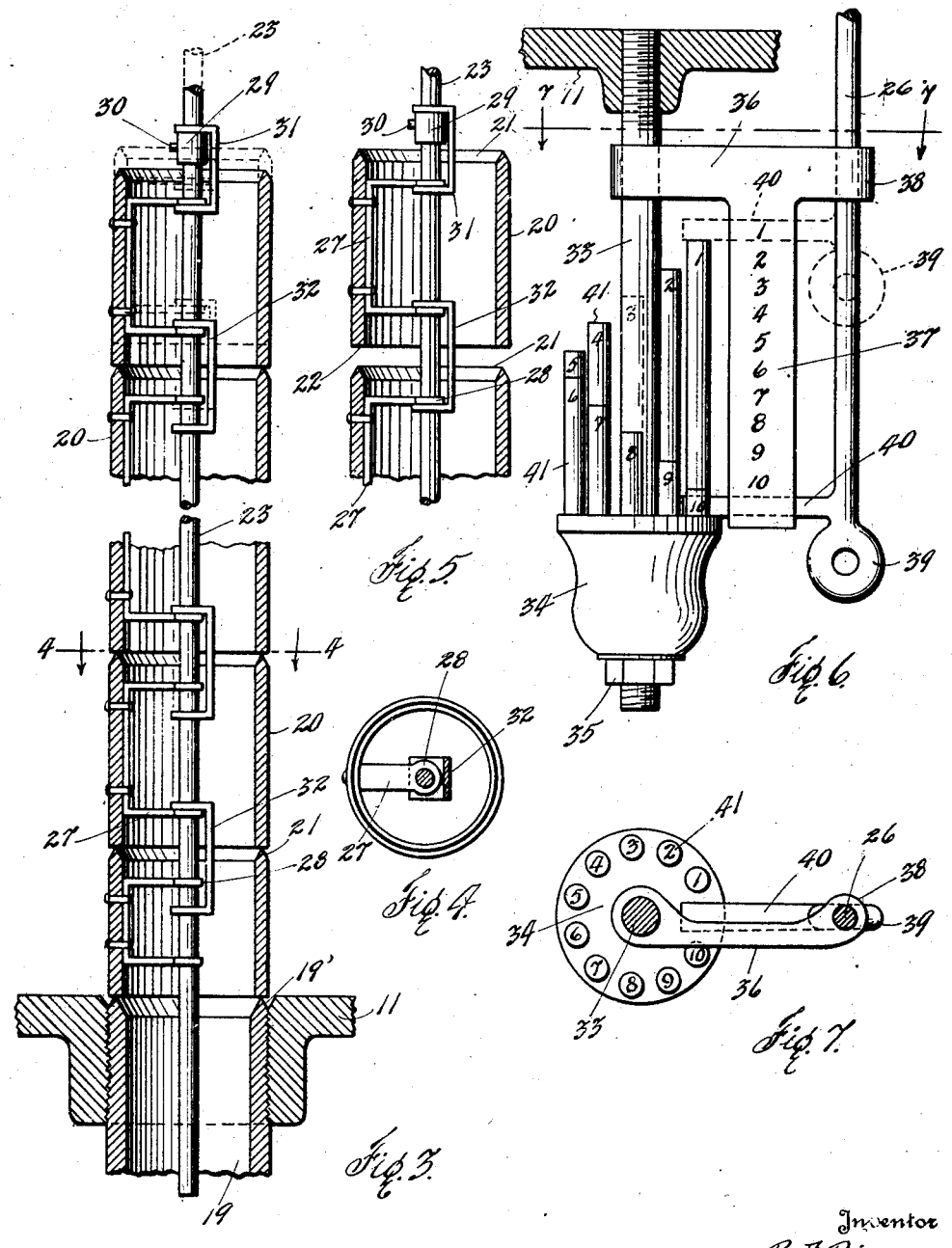

1,662,338

UNITED STATES PATENT OFFICE.

ROSS E. RISSER, OF BONHAM, TEXAS, ASSIGNOR TO CATRON MANUFACTURING COMPANY, OF BONHAM, TEXAS, A CORPORATION OF TEXAS.

UNIT-MEASURING LIQUID DISPENSER.

Application filed November 13, 1925. Serial No. 68,766.

This invention relates to new and useful improvements in unit measuring liquid dispensers.

This invention is related to the invention forming the subject matter of my co-pending application filed July 27th, 1925, Serial No. 46,232, and is an improvement over the structure shown in the drawings of said application.

The object of the invention is to combine with the unit measuring feature the overflow conductor for the measuring container.

A particular object of the invention is to provide a vertical overflow conductor in the container arranged to be opened at predetermined levels, whereby the exact quantity of liquid which is to be dispensed is retained in the container and the remainder is conducted from the container through the said overflow conductor.

A further object of the invention is to provide a combination overflow and unit-measuring conductor arranged to be positively opened at the desired level to dispense the required quantity and to drain the remainder, together with a convenient simple and efficient device for setting the operating parts to carry out said dispensing and draining operation.

Another object of the invention is to provide a conductor formed of a plurality of superimposed valves arranged so that any of the valves may be lifted to open the conductor at a predetermined measuring level.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a vertical sectional view of a liquid dispenser constructed in accordance with my invention.

Fig. 2 is a horizontal cross-sectional view taken on the line 2—2 of Fig. 1,

Fig. 3 is a vertical sectional view of the measuring and dispensing conductor or column, the valves being closed, Fig. 4 is a cross-sectional view taken on the line 4—4 of Fig. 3, Fig. 5 is a sectional view showing the valves open, Fig. 6 is a detail of the valve setting and lifting means, and Fig. 7 is a cross-sectional view taken on the line 7—7 of Fig. 6.

In the drawings the numeral 10 designates a vertical glass cylinder or container which is suitably mounted on a flanged base 11, which is carried by a pedestal 12. A flanged cap 13 covers the top of the cylinder. A supply pipe 14 is connected in the base for supplying liquid to the container. A dispensing elbow 15 is also connected in the base. The lower end of the elbow is connected to a short pipe 16 which extends through the pedestal. A dispensing valve 17 of suitable construction is screwed on the outer end of the pipe and the usual drain hose 18 is connected to the valve 17. The liquid, such as gasoline, is dispensed from the container through the parts 15, 16, 17 and 18 by opening the valve in the usual manner. An overflow pipe 19 has its upper end connected in the base 11 and leads to the storage tank (not shown). The upper end of the pipe is reduced to approximately a knife edge to form a valve seat 19', which is approximately flush with the upper surface of the base 11.

The important feature of the invention is a combined unit measuring an overflow column or conductor which I have illustrated as composed of a plurality of cylindrical valves 20, the lowermost of which rests on the seat 19'. In order to obtain an effective closure between the superimposed valves, the upper edge 21 of each valve has a double bevel, whereby it is reduced to an approximate knife edge, but not a cutting edge. The bottom edge 22 of each valve which rests upon the flat edge 21 and the seat 19', is cut horizontally across the valve so as to be flat and to readily seat upon the said edge 21. By this arrangement the chance of obstructions lodging between the valves is reduced to a minimum.

I have illustrated a glass cylinder for containing and dispensing ten gallons, which is the quantity in the container when the liquid is level with the top of the conductor formed by the superimposed valves. Ten valves are shown and when the liquid above the uppermost valve is drained out, ten gallons remain in the container. For each gallon a valve is provided and if the top valve is raised or lifted, a gallon of liquid will drain out between it and the next lowest valve until the liquid is level with the top of the said next lowest valve, whereupon nine gallons will remain in the container.

It will be seen that by lifting a predetermined number of valves a like number of gallons will be drained from the container leaving the remainder to be dispensed. By providing suitable means for lifting the valves together with means for setting the lifting means so that the required number of gallons to be dispensed remain in the container and the surplus is drained out, a positive unit measuring dispenser is provided together with an overflow conductor, so that when the dispensing valve 17 has been opened and the liquid dispensed, the container will be empty. In this type of dispenser the container is only supplied with liquid when liquid is to be dispensed and is empty at other times.

For raising the valves individually and collectively I provide a lifter comprising a vertical rod 23 depending through the cap 13 and extending down the center of the conductor. This rod is supported by a horizontal arm 24 in which the rod is fastened by nuts 25. The arm is carried on the upper end of an upright staff 26. In each valve 20 is fastened a C-shaped bracket 27 having eyes 28 on the ends of its horizontal arms through which the rod 23 slides. On the rod just above the top valve 20 is fastened a collar 29 by means of a set screw 30. A yoke 31 having eyes at each end receiving the rod has its upper end carried by the collar; while its lower end is disposed below the top arm of the bracket of the top valve.

It will be seen that when the rod is lifted the yoke 31 will be elevated. After the yoke has been lifted a short distance it will engage the bracket 27 and continued lifting movement will elevate the top valve 20, which will thus be separated from the next lowest valve. Other yokes 32 mounted on the rod 23 normally rest upon the eye 28 of the lowest arm of each valve and have their lower ends spaced below the upper eye of each bracket. It will be seen that when one valve has been lifted to provide an opening between it and the next lowest valve, continued movement will lift the next valve through the agency of the yoke. It is pointed out that the conductor may be opened at any measuring level by lifting the valves above said level.

In order to relieve the operator from gauging or guessing I provide a setting device for dispensing the exact number of gallons desired. This device comprises a stationary post or hanger 33 depending from the base 11 and accessible through a suitable opening (not shown) in the pedestal 12. On the lower end of this post a knob or rotor 34 is journaled to rotate and is supported by a nut 35. A bracket 36 (Fig. 6) is mounted on the post and has a depending panel 37 on which numerals ranging from 1 to 10 are disposed in a vertical column with the numeral 1 at the top. The panel hangs between the post and the staff 26 which latter passes through an eye 38 at one side of the bracket.

To raise and lower the staff 26 I provide a finger hold 39 or other member at the bottom thereof. An integral arm 40 extends laterally from the staff just above the finger hold and behind the panel 37. The outer end of this arm overhangs the adjacent side of the rotor 34. On the rotor I mount ten vertical pins 41 which for convenience I have numbered in Fig. 7, 1 to 10. The pin No. 1 is the highest and the pin 10 is the lowest. The intermediate pins are successively stepped in height from the highest to the lowest, each corresponding to one of the numerals on the panel 37.

The overhanging end of the arm 40 may be supported on any of the pins by lifting the staff 26 and turning the rotor to bring the desired pin thereunder and then lowering the staff until said arm rests upon the pin. The pins and numerals on the panel 37 are calibrated so that the adjustment of the arm 40 thereto will lift the required number of valves 20 to drain the container 10 until only the number of gallons corresponding to the number on the panel to which the number on the panel to which the arm is adjusted, remain in said container. It will be seen that when the arm rests on pin No. 10, none of the valves will be lifted and ten gallons will remain in the container, whereas if the arm rests upon the pin No. 1, nine of the valves will be lifted, thus draining out nine gallons and leaving one gallon in the container.

In operating the dispenser the container 10 is normally empty. When a quantity of liquid is to be dispensed the operator grasps the hand hold 39 with one hand and pushes the staff 26 upward and thus lifts the rod 23 and the valves 20, as well as carrying the arm 40 upward out of the path of the pins 41. With the other hand he turns the rotor until one of the pins is opposite the numeral on the panel 37 corresponding to the number of gallons to be dispensed. He then lowers the staff until the arm rests on said pin and stands behind said numeral. Thus if six gallons were ordered he would turn the rotor until one of the pins was opposite the numeral 6, whereupon he would lower the arm 40 until it rested on said pin and stood behind said numeral.

This operation would lift the four uppermost valves 20 leaving the six valves below in contact, so that the liquid would drain out down to the level of the sixth valve, thus leaving six gallons in the container.

The operator after setting the valve supplies liquid to the container 10 through the pipe 14, which liquid will drain out through the conductor and pipe 19 to the level of the highest closed valve, those which have been lifted being open. He then has only to open the dispensing valve 17 to dispense the liquid from the container 10 through the hose 18. It is of course not necessary to fill the container unless ten gallons are to be dispensed, but merely enough liquid is supplied to provide the number of gallons to be dispensed.

While I have shown a conductor composed of superimposed valves, the invention is not to be limited to the same and such modifications, alterations and changes as come within the scope of the appended claims may be made.

What I claim, is:

1. In a fluid dispenser, a measuring container, a drain pipe leading therefrom, a dispensing valve connected with the bottom of the container independent of said pipe, a tubular valve column forming a variable overflow communicating at its bottom with the drain pipe and composed of transversely separable sections, a reciprocating member within the column connected to said sections, a vertical operating connection for said member, and stepped supports movable to successively engage said connection for setting said member at selected points for separating a predetermined number of valve sections.

2. In a fluid dispenser, the combination with a measuring container and a discharge pipe therefrom, of a plurality of tubular valves in said container connected with said pipe, a rod depending from the top of the container and connected with the valves for successively lifting the same, a vertical staff outside the container connected with the rod and carrying a finger, a rotatable member, and a plurality of stepped pins thereon adjustable into the path of the finger of the staff.

3. In a fluid dispenser, the combination with a measuring container and a discharge pipe therefrom, of a plurality of tubular valves in said container connected with said pipe, a rod depending from the top of the container and connected with the valves for successively lifting the same, a vertical staff outside the container connected with the rod and carrying a finger, a post provided with a rotatable member, a circumferential series of pins on said member extending upward to different heights, a bracket exending from said post to support said staff, and a depending panel from said bracket disposed to guide the finger of the staff.

4. A liquid dispensing device having in combination a container adapted to hold a quantity of liquid, an outlet, a sectional conduit extending vertically upward through said liquid and communicating at its lower end with said outlet, means for separating a predetermined number of said sections so as to cause a measured quantity of said liquid to flow through the outlet, an operating connection for said means, and a movable device having stepped members disposed to support said connection at different elevations.

In testimony whereof I affix my signature.

ROSS E. RISSER.